US011881142B1

(12) United States Patent
Li et al.

(10) Patent No.: US 11,881,142 B1
(45) Date of Patent: Jan. 23, 2024

(54) IMAGE BRIGHTNESS ADJUSTING METHOD AND IMAGE BRIGHTNESS ADJUSTING DEVICE

(71) Applicant: Realtek Semiconductor Corp., HsinChu (TW)

(72) Inventors: Yi-Chu Li, HsinChu (TW); Chun-Hsing Hsieh, HsinChu (TW); Yi-Lin Tsai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/206,092

(22) Filed: Jun. 6, 2023

(30) Foreign Application Priority Data

Dec. 30, 2022 (TW) ................................. 111150788

(51) Int. Cl.
*G09G 3/20* (2006.01)

(52) U.S. Cl.
CPC ....... *G09G 3/20* (2013.01); *G09G 2320/0233* (2013.01); *G09G 2320/0247* (2013.01); *G09G 2320/0626* (2013.01); *G09G 2360/16* (2013.01)

(58) Field of Classification Search
CPC ............. G09G 3/20; G09G 2320/0233; G09G 2320/0247; G09G 2320/0626; G09G 2360/16
See application file for complete search history.

(56) References Cited

U.S. PATENT DOCUMENTS

| | | | | |
|---|---|---|---|---|
| 2020/0082747 | A1* | 3/2020 | Tian | G11C 19/28 |
| 2020/0082756 | A1* | 3/2020 | Lin | G09G 3/3233 |
| 2020/0082767 | A1* | 3/2020 | Chen | G09G 3/3266 |
| 2020/0082775 | A1* | 3/2020 | Chen | G09G 3/3685 |
| 2020/0082788 | A1* | 3/2020 | Qiu | G09G 5/10 |
| 2020/0082791 | A1* | 3/2020 | Petrie | G09G 3/20 |

* cited by examiner

*Primary Examiner* — Sejoon Ahn
(74) *Attorney, Agent, or Firm* — Winston Hsu

(57) ABSTRACT

An image brightness adjusting method, comprising: (a) computing or predicting a first input frame rate according to at least one first input image; (b) generating a first brightness according to a first brightness curve and the first input frame rate, wherein the first brightness curve corresponds to a first frame rate; (c) generating a second brightness according to a second brightness curve and the first input frame rate, wherein the second brightness curve corresponds to a second frame rate; (d) generating a first brightness compensating curve according to the first input frame rate and a brightness difference between the first brightness and the second brightness; and (e) setting a first compensating brightness of at least one second input image according to the first brightness compensating curve.

19 Claims, 9 Drawing Sheets

IMAGE BRIGHTNESS ADJUSTING METHOD AND IMAGE BRIGHTNESS ADJUSTING DEVICE

BACKGROUND OF THE INVENTION

1. Field of the Invention

The present invention relates to an image brightness adjusting method and an image brightness adjusting device, and particularly relates to an image brightness adjusting method and an image brightness adjusting device which can dynamically adjust the image brightness according to frame rates.

2. Description of the Prior Art

With the development of science and technology, the popularity of games on various electronic devices is also increasing. Some electronic devices comprise a GPU (Graphics Processing Unit) to draw game screens, and then transmit the game screens to a monitor for displaying. However, if the frame refresh rate of the monitor (i.e., the monitor frame rate) and the frame rate of the GPU are not synchronized, screen tearing problems may exist. In order to solve such problem, the frame rate of the monitor is usually changed to synchronize with the frame rate of the GPU. However, monitors usually have higher brightness at high frame rates and lower brightness at low frequencies. Therefore, if the frame rate of the monitor continuously changes, the displayed screens may have flicker.

SUMMARY OF THE INVENTION

One objective of the present invention is to provide an image brightness adjusting method which can dynamically adjust the image brightness.

Another objective of the present invention is to provide an image brightness adjusting device which can dynamically adjust the image brightness.

One embodiment of the present invention discloses an image brightness adjusting method, comprising: (a) computing or predicting a first input frame rate according to at least one first input image; (b) generating a first brightness according to a first brightness curve and the first input frame rate, wherein the first brightness curve corresponds to a first frame rate; (c) generating a second brightness according to a second brightness curve and the first input frame rate, wherein the second brightness curve corresponds to a second frame rate; (d) generating a first brightness compensating curve according to the first input frame rate and a brightness difference between the first brightness and the second brightness; and (e) setting a first compensating brightness of at least one second input image according to the first brightness compensating curve.

Another embodiment of the present invention discloses an image brightness adjusting method, comprising: (a) acquiring a predicting frame rate of at least one first input image; (b) generating a first brightness according to a first brightness curve and the predicting frame rate, wherein the first brightness curve corresponds to a first frame rate; (c) generating a second brightness according to a second brightness curve and the predicting frame rate, wherein the second brightness curve corresponds to a second frame rate; (d) generating a first brightness compensating curve according to the predicting frame rate and a brightness difference between the first brightness and the second brightness; and (e) setting a first compensating brightness of the first input image according to the first brightness compensating curve.

Still embodiment of the present invention discloses an image brightness adjusting device, comprising: a frame rate predicting/computing device, configured to compute or to predict a first input frame rate according to at least one first input image; and a brightness compensating device, configured to perform following steps: (a) generating a first brightness according to a first brightness curve and the first input frame rate, wherein the first brightness curve corresponds to a first frame rate; (b) generating a second brightness according to a second brightness curve and the first input frame rate, wherein the second brightness curve corresponds to a second frame rate; (c) generating a first brightness compensating curve according to the first input frame rate and a brightness difference between the first brightness and the second brightness; and (d) setting a first compensating brightness of at least one second input image according to the first brightness compensating curve.

As mentioned above, the image brightness adjusting method and the image brightness adjusting device provided by the present invention can dynamically adjust the image brightness, to reduce the brightness difference of the images at different frame rates and improve the flickering problem in the prior art.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term “first”, “second”, “third” in following descriptions are only for the purpose of distinguishing different one elements, and do not mean the sequence of the elements. For example, a first device and a second device only mean these devices can have the same structure but are different devices.

Figure 1:
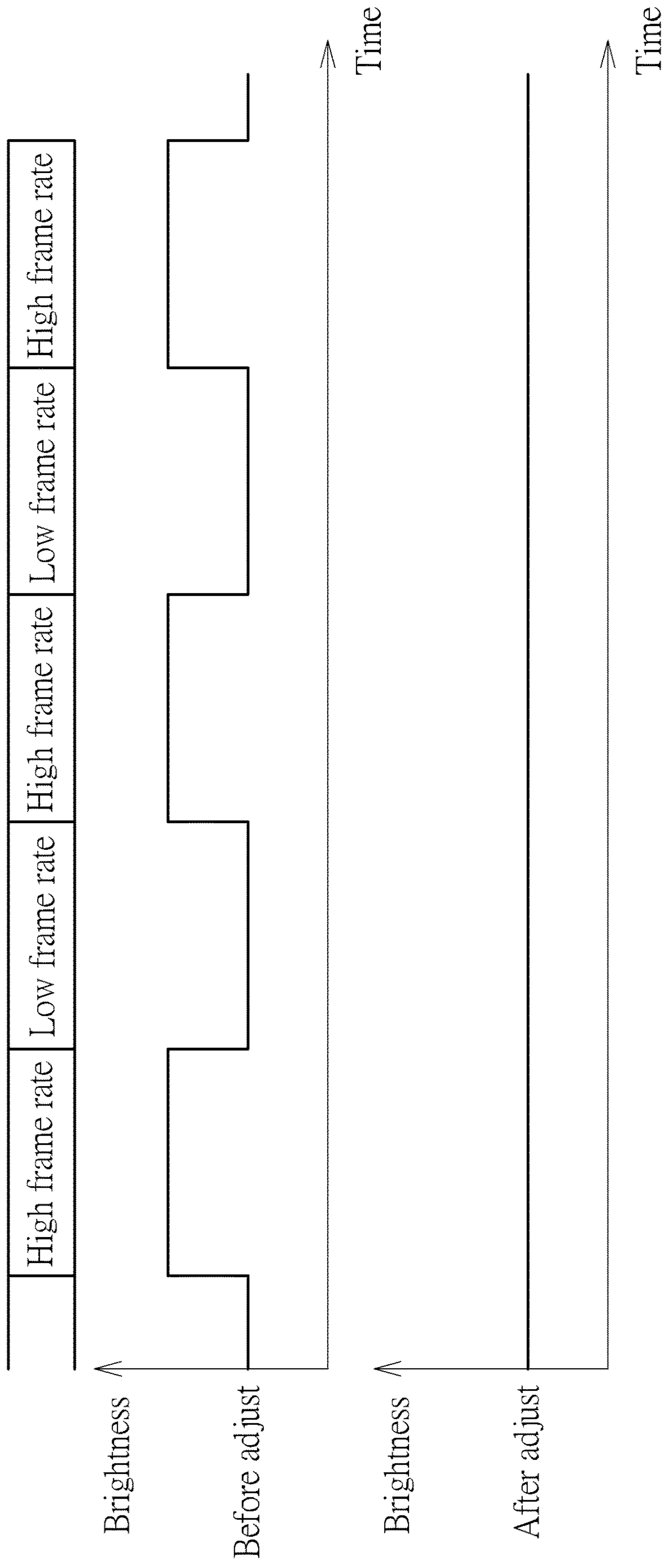
FIG. 1 is a schematic diagram illustrating an image brightness adjusting method according to one embodiment of the present invention.

FIG. 1 is a schematic diagram illustrating an image brightness adjusting method according to one embodiment of the present invention. As shown in FIG. 1, before adjustment, if the image has a high frame rate, it has higher brightness, and if the image has a low frame rate, it has lower brightness. Therefore, the present invention uses some adjustment mechanisms to reduce the brightness difference between brightness corresponding to the high frame rate and brightness corresponding to the low frame rate. In one embodiment, the brightness corresponding to the high frame rate is equal to which corresponding to the low frame rate. Various methods can be used to achieve such step, for example, reduce the brightness corresponding to the high frame rates but keep the same brightness corresponding to the low frame rate, or keep the same brightness corresponding to the high frame rates but increase the brightness corresponding to the low frame rate, or reduce the brightness corresponding to the high frame rate to a predetermined brightness and increase the brightness corresponding to the low frame rate to the predetermined brightness. Detail steps will be described in following descriptions.

Figure 2:
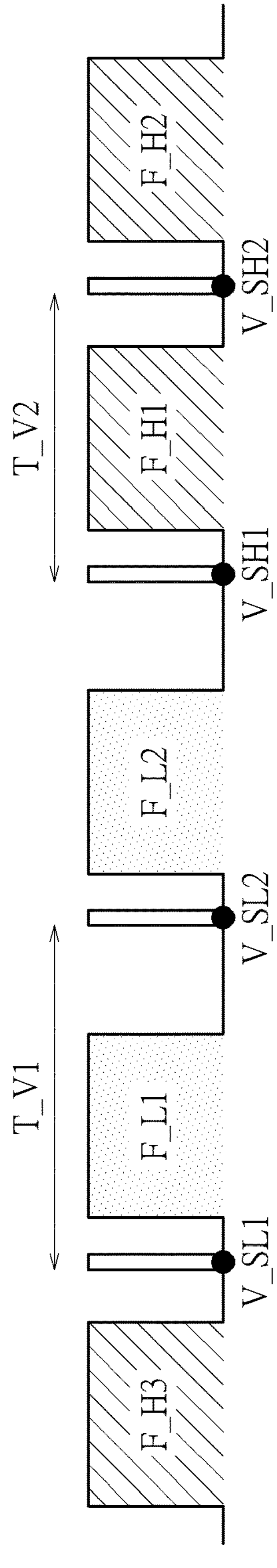
FIG. 2 and FIG. 3 are schematic diagrams illustrating the step of computing a frame rate, according to embodiments of the present invention.
Figure 3:
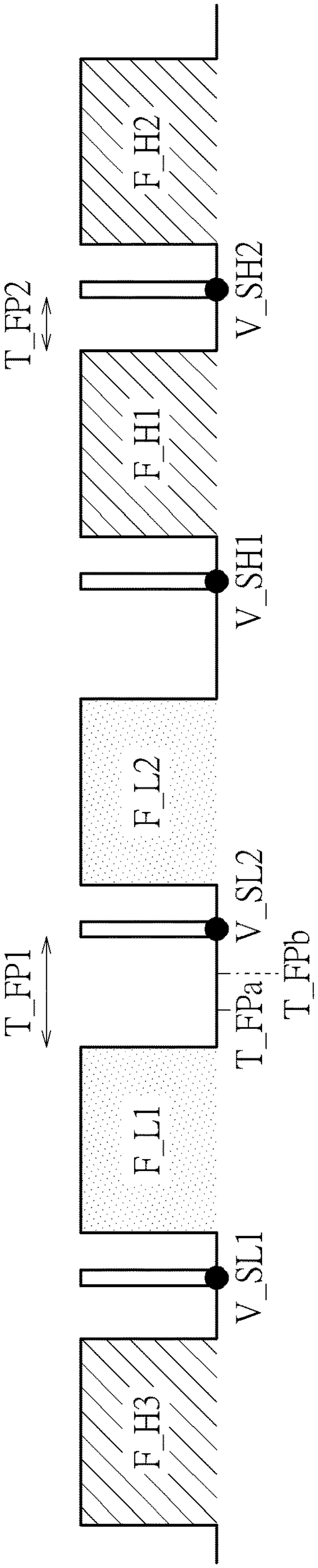

FIG. 2 and FIG. 3 are schematic diagrams illustrating the step of computing a frame rate, according to embodiments of the present invention. In FIG. 2 and FIG. 3, the horizontal axis is a time axis for the GPU to transmit frames or for the monitor to display frames. In the embodiment of FIG. 2, the first input frame rate is calculated according to a time interval between two consecutive Vsyncs. For more detail, in FIG. 2, frames F_L1 and F_L2 are frames corresponding to a low frame rate, and frames F_H1, F_H2, F_H3 are frames corresponding to a high frame rate. No matter which frame rate the frame corresponds to, a Vsync signal always exists before start to transmit the frames. When the frames correspond to a low frame rate, a time interval between two consecutive Vsync signals is longer. On the contrary, when the frames correspond to a high frame rate, a time interval between two consecutive Vsync signals is short. Take FIG. 2 for example, the time interval T_V1 between the two Vsync signals V_SL1 and V_SL2 which are respectively before and after the frame F_L1 is longer than the time interval T_V2 between the two Vsync signals V_SH1 and V_SH2 which are respectively before and after the frame F_H1. Accordingly, by calculating the time interval between two consecutive Vsync signals, the frame rate of the current frame can be acquired.

In the embodiment of FIG. 3, the frame rate is calculated according to the front porch of the Vsync signal. The front porch means a time interval between the end of frame data and the closest Vsync signal. For example, in FIG. 3, the time interval T_FP1 is the front porch of the Vsync signal V_SL2. When the frames correspond to a low frame rate, the corresponding front porch time interval is longer. Conversely, when the frames correspond to a high frame rate, the corresponding front porch time interval is shorter. Take FIG. 3 for example, the time interval T_FP1 is longer than the time interval T_FP2. Thus, the frame rate can be calculated by measuring the time interval length of the front porch.

In one embodiment, the frame rate is calculated according to a complete time interval of the front porch. Take FIG. 3 for example, after calculate the complete time interval T_FP1 (for example, calculate from the end of the frame F_L1 until the Vsync signal V_SL2 is detected), the frame rate is calculated accordingly. In another embodiment, the frame rate is calculated based on only a portion of the time interval of the front porch. Take FIG. 3 for example, when calculating the time interval of the front porch of the Vsync signal V_SL2, the frame rate is calculated only according to the time interval T_FPa when acquiring a length of the time interval T_FPa. Such action can be repeated and the frame rate is correspondingly updated within a single porch interval. As shown in FIG. 3, after the frame rate is calculated according to the time interval T_FPa and the compensating brightness curve is generated accordingly, a new frame rate can be calculated according to the time interval T_FPb and another compensating brightness curve is generated accordingly. In the embodiment in which the frame rate is calculated according to only a portion of the time interval, the frame rate can be updated more frequently and the compensating brightness curve can be updated more frequently to improve the flicker problem in the prior art. Details about the compensating brightness curve will be described in the following description.

Figure 4:
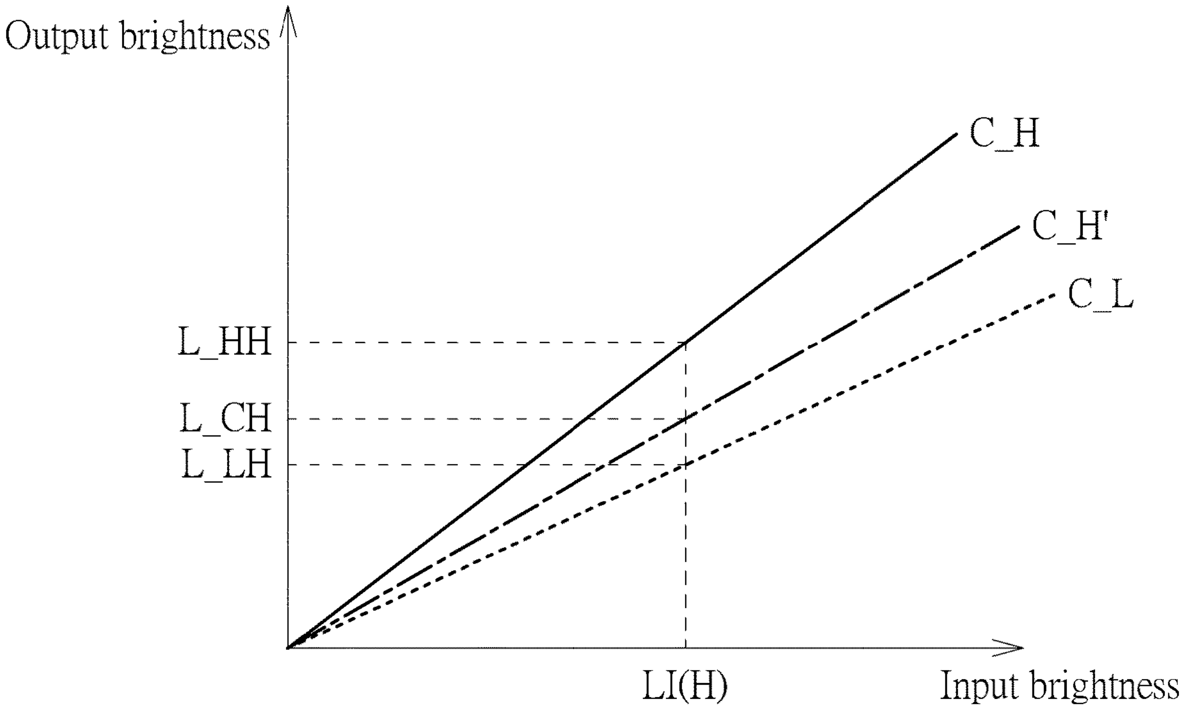
FIG. 4, FIG. 5 and FIG. 6 are schematic diagrams illustrating the step of generating a brightness compensating curve, according to embodiments of the present invention.
Figure 5:
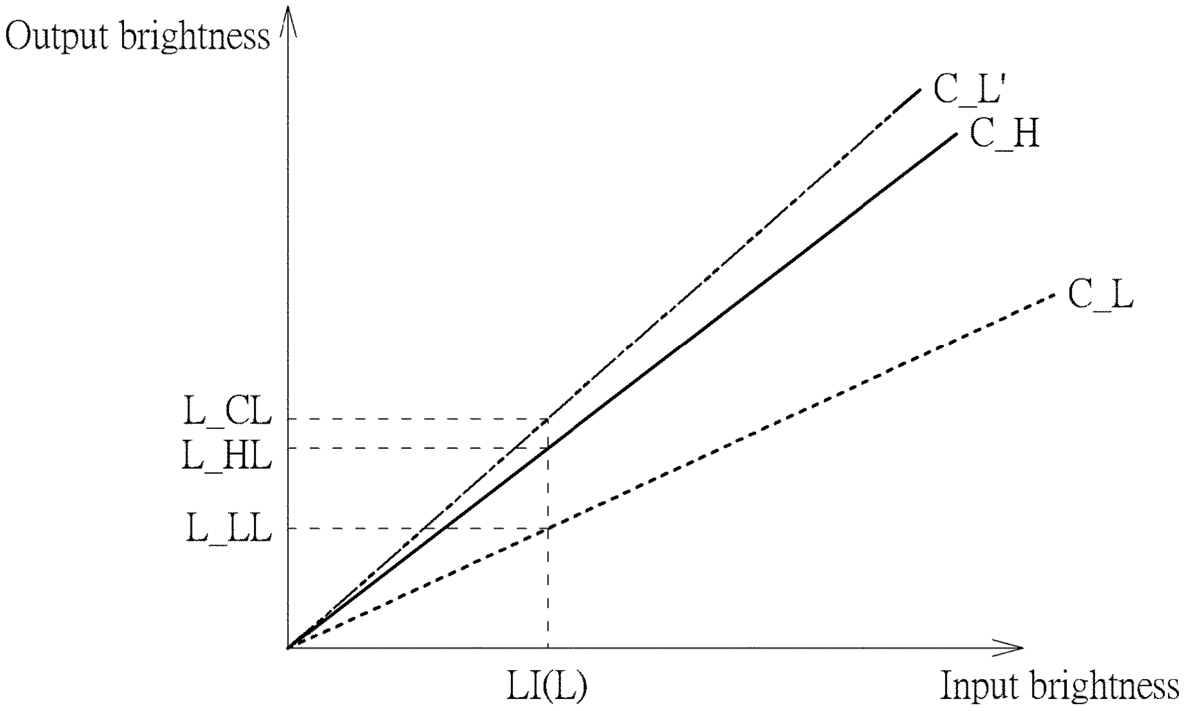
Figure 6:
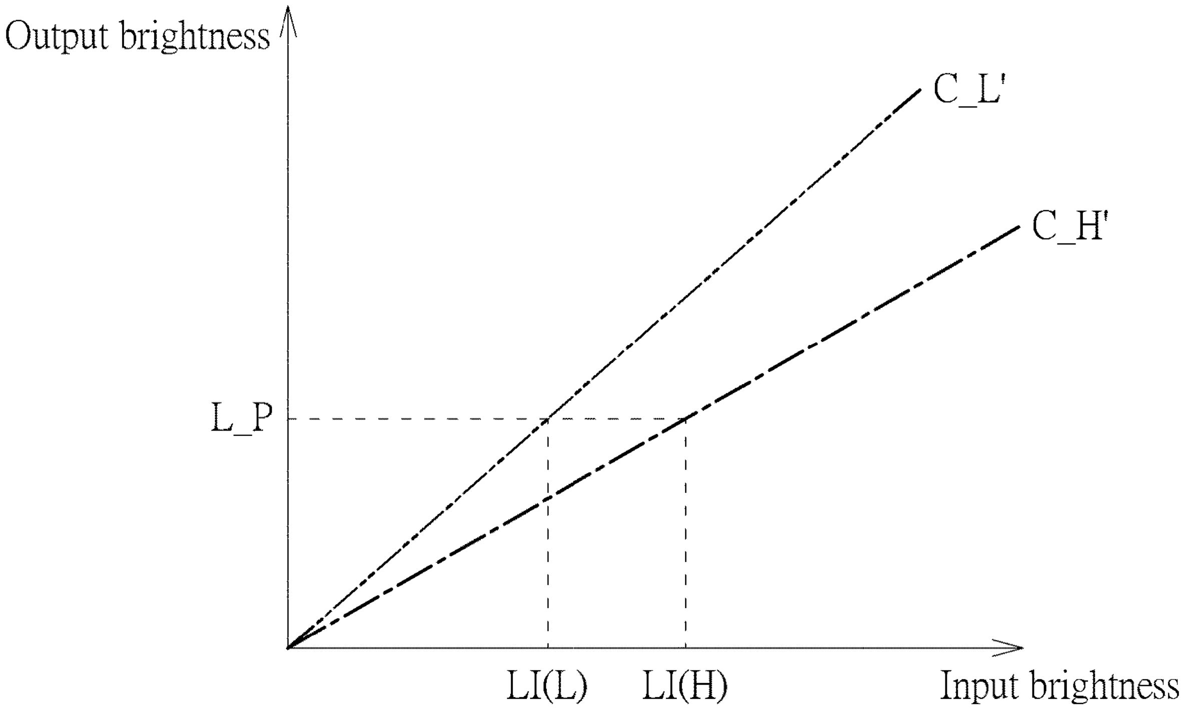

After the frame rate is calculated, a brightness compensating curve can be generated according to the frame rate. FIG. 4, FIG. 5 and FIG. 6 are schematic diagrams illustrating the step of generating a brightness compensating curve, according to embodiments of the present invention. The embodiments in FIG. 4, FIG. 5 and FIG. 6 all comprise a high frame rate brightness curve C_H and a low frame rate brightness curve C_L. The high frame rate brightness curve C_H corresponds to a high frame rate for displaying images, and the low frame rate brightness curve C_L corresponds to a low frame rate for displaying images. In one embodiment, the high frame rate brightness curve C_H corresponds to a possible maximum frame rate of the display (for example, 120 Hz), and the low frame rate brightness curve C_L corresponds to a possible minimum frame rate of the display (for example, 48 Hz). Both the high frame rate brightness curve C_H and the low frame rate brightness curve C_L represent conversion curves from input brightness to output brightness. In following descriptions, the brightness compensating curve is calculated according to the frame rate calculated according to the above-mentioned embodiments, the high frame rate brightness curve C_H, and the low frame rate brightness curve C_L, to adjust the brightness of the image. Please also note that, for the convenience of understanding, linear straight lines are used as examples for explaining the high frame rate brightness curve C_H and the low frame rate brightness curve C_L, but they can also be other curves. For example, in one embodiment, the high frame rate brightness curve C_H is a gamma 1 curve and the frame rate brightness curve C_L is a gamma 2 curve.

In the embodiment of FIG. 4, it is assumed that the calculated frame rate is closer to the high frame rate, thus the calculated frame rate without adjustment is applicable to the high frame rate brightness curve C_H, and it is assumed that the input brightness corresponding to the calculated frame rate is LI(H). In the embodiment in FIG. 4, the input brightness LI(H) is filled into the high frame rate brightness curve C_H and the low frame rate brightness curve C_L to acquire two output brightness L_LH and L_HH. Then, the compensating brightness curve C_H' is calculated according to the brightness difference between the two output brightness L_LH and L_HH. Compensating brightness L_CH can be acquired via filling the input brightness LI(H) into the compensating brightness curve C_H'. The compensating brightness L_CH may be any value between the output brightness L_LH and L_HH, or a value lower than the output brightness L_LH. In one embodiment, the brightness difference between the compensating brightness L_CH and the brightness L_LH is smaller than the brightness difference between the compensating brightness L_CH and the brightness L_HH. But the compensating brightness L_CH can be a predetermined brightness. In addition, the compensating brightness curve C_H' can be generated by changing or shifting one of the high frame rate brightness curve C_H and the low frame rate brightness curve C_L, or be generated by re-generating a new brightness curve. In the embodiment of FIG. 4, the compensating brightness curve C_H' is generated by changing or shifting the high frame rate brightness curve C_H.

In the embodiment of FIG. 5, it is assumed that the calculated frame rate is closer to the low frame rate, thus the calculated frame rate without adjustment is applicable to the low frame rate brightness curve C_L without adjustment, and it is assumed that the input brightness corresponding to the calculated frame rate is LI(L). In the embodiment in FIG. 5, the input brightness LI(L) is filled into the high frame rate brightness curve C_H and the low frame rate brightness curve C_L to acquire two output brightness L_LL and L_HL. Then, the compensating brightness curve C_L' is calculated according to the brightness difference between the two output brightness L_LL and L_HL. Compensating brightness L_CL can be acquired via filling the input brightness LI(L) into the compensating brightness curve C_L'. The compensating brightness L_CL may be a value larger than the output brightness L_HL as shown in FIG. 5, or be any value between the output brightness L_LL and L_HL. In one embodiment, the brightness difference between the compensating brightness L_CL and the brightness L_HL is smaller than the brightness difference between the compensating brightness L_CL and the brightness L_LL. But the compensating brightness L_CL can be a predetermined brightness, which is identical with the predetermined brightness illustrated in FIG. 4. In addition, the compensating brightness curve C_L' can be generated by changing or shifting one of the high frame rate brightness curve C_H and the low frame rate brightness curve C_L, or be generated by re-generating a new brightness curve. In the embodiment of FIG. 5, the compensating brightness curve C_L' is generated by changing or shifting the low frame rate brightness curve C_L.

FIG. 6 illustrates an embodiment in which the compensating brightness curve C_H' and the compensating brightness curve C_L' are generated according to the embodiments of FIG. 4 and FIG. 5. Also, in FIG. 6, the compensating brightness L_CL and L_CH in FIG. 4 and FIG. 5 are the predetermined brightness L_P. Therefore, no matter whether the frame rate is applicable to the compensating brightness curve C_H' or the compensating brightness curve C_L', the image has the same predetermined brightness L_P. Please note, the aforementioned frame rate means the frame rate of the image displayed on the monitor, and the aforementioned compensating brightness means the compensating brightness of the image displayed on the monitor. Therefore, various ways can be used to adjust the brightness. For example, the brightness of the image itself can be adjusted, the backlight intensity of the display can be adjusted, or the voltage used to control the compensating brightness in the display driving circuit can be adjusted. However, the scope of the present invention is not limited to these examples.

In the aforementioned embodiments, the brightness compensating curve is generated based on the calculated frame rate. However, a predicting frame rate can also be used to generate the brightness compensating curve. In one embodiment, digital filters such as IIR (Infinite Impulse Response, infinite impulse response) and FIR (Finite Impulse Response, finite impulse response) can be used to predict the future frame rate. For example, the following formula can be used to predict the future frame rate.

$$F_{next}=IIR(F_{pre},F_{cur}) \text{ or } F_{next}=FIR(F_{pre},F_{cur})$$

Fpre means the frame rate of the previous image, Fcur means the frame rate of the current image, and Fnext means the predicted future frame rate. Take the embodiment in FIG. 2 for example, the frame rate corresponding to the frame F_H3 (Fpre) and the frame rate corresponding to the frame F_L1 (Fcur) can be used to predict the frame rate corresponding to the frame F_L2 (Fnext). After that, the frame F_L2 is processed with the predicted future frame rate Fnext. The present invention is not limited to process the frame next to the current frame with the predicted future frame rate. For example, the frame rate corresponding to the frame F_H3 (Fpre) and the frame rate corresponding to the frame F_L1 (Fcur) can be used to predict the frame rate corresponding to F_L2 ($F_{next}$), and the frames F_L2 and F_H1 are processed with the predicted future frame rate Fnext. In another embodiment, the current frame F_L1 can be processed with a previously predicting frame rate.

Figure 7:
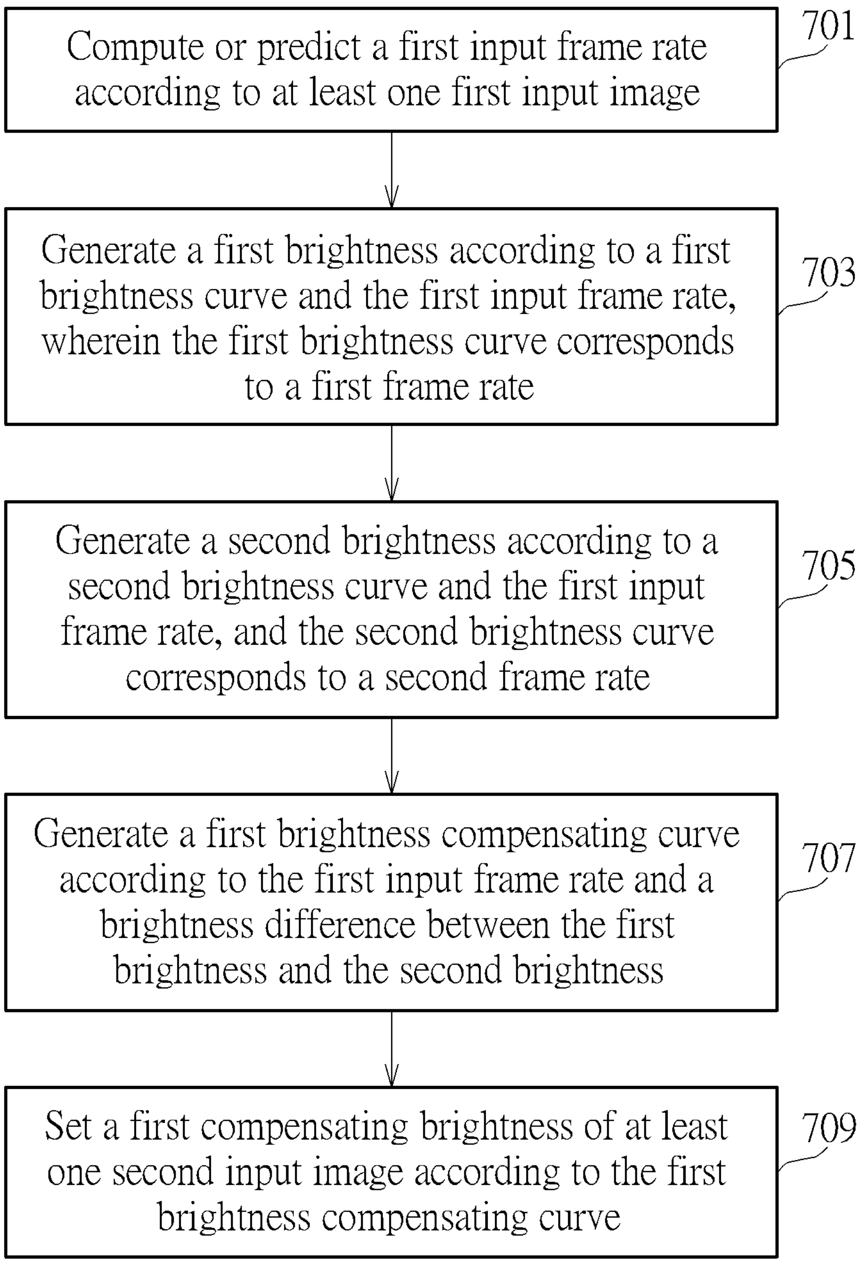
FIG. 7 and FIG. 8 are flow charts illustrating image brightness adjusting methods according to different embodiments of the present invention.

In view of aforementioned embodiments, the image brightness adjusting method shown in FIG. 7 can be obtained, which comprises the following steps:

Step 701

Compute or predict a first input frame rate according to at least one first input image.

Take FIG. 2 for example, the frame F_L1 is used to calculate the frame rate or predict the frame rate.

Step 703

Generate a first brightness according to a first brightness curve and the first input frame rate, wherein the first brightness curve corresponds to a first frame rate Step 705

Generate a second brightness according to a second brightness curve and the first input frame rate, and the second brightness curve corresponds to a second frame rate.

Step 707

Generate a first brightness compensating curve according to the first input frame rate and a brightness difference between the first brightness and the second brightness.

Step 709

Set a first compensating brightness of at least one second input image according to the first brightness compensating curve.

For steps 703 to 709, take FIG. 2 for example, if the frame rate is calculated based on the frame rate of the first input image (frame F_L1), the second input image may mean an image subsequent to the first input image, (e.g., frame F_L2), but can also mean the first input image itself. If the frame rate is the predicting frame rate, the second input image may mean an image subsequent to the first input image, such as the frame F_L2. Briefly, in the embodiment of FIG. 7, the current image or the future image can be processed according to the frame rate calculated from the current image, or the future image can be processed according to the frame rate predicted from the current image.

If the embodiment described in FIG. 7 only corresponds to FIG. 4, the first frame rate is a high frame rate, and the second frame rate is a low frame rate. The first brightness curve is the brightness curve C_H, the second brightness curve is the brightness curve C_L, and the first brightness compensating curve is the brightness compensating curve C_H'. In such case, the first brightness (L_HH) is higher than the second brightness (L_LH), and the first compensating brightness L_CH is lower than the first brightness and higher than the second brightness. As above-mentioned, in the embodiment of FIG. 4, the first brightness compensating curve (brightness compensating curve C_H') can be generated according to the first brightness curve (brightness curve C_H).

Besides, for an embodiment corresponding to FIG. 4 combined with FIG. 5, the image brightness adjustment method shown in FIG. 7 may further comprise:

computing or predicting a second input frame rate according to at least one third input image; generating a third brightness (e.g., brightness L_LL in FIG. 5) according to the first brightness curve and the second input frame rate; generating a fourth brightness (such as the brightness L_HL in FIG. 5) according to the second brightness curve and the second input frame rate; generating a second brightness compensating curve (e.g., the brightness compensating curve C_L' in FIG. 5) according to the second input frame rate and a brightness difference between the third brightness and the fourth brightness; and setting a second compensating brightness (e.g., compensating brightness L_CL) of at least one fourth input image with the second frame rate, according to the second brightness compensating curve. However, if the method corresponds to the embodiment shown in FIG. 6, the first compensating brightness is the same as the second compensating brightness (both are the predetermined compensating brightness L_P shown in FIG. 6).

If the embodiment described in FIG. 7 only corresponds to FIG. 5, the first frame rate is a low frame rate, and the second frame rate is a high frame rate. The first brightness curve is the brightness curve C_L, the second brightness curve is the brightness curve C_H, and the first brightness compensating curve is the brightness compensating curve C_L'. In such case, the first brightness (brightness L_LL) is lower than the second brightness (brightness L_HL), and the first compensating brightness L_CL is higher than the first brightness and the second brightness. As mentioned above, in the embodiment of FIG. 5, the first brightness compensating curve (brightness compensating curve C_L') can be generated according to the first brightness curve (brightness curve C_L).

Figure 8:
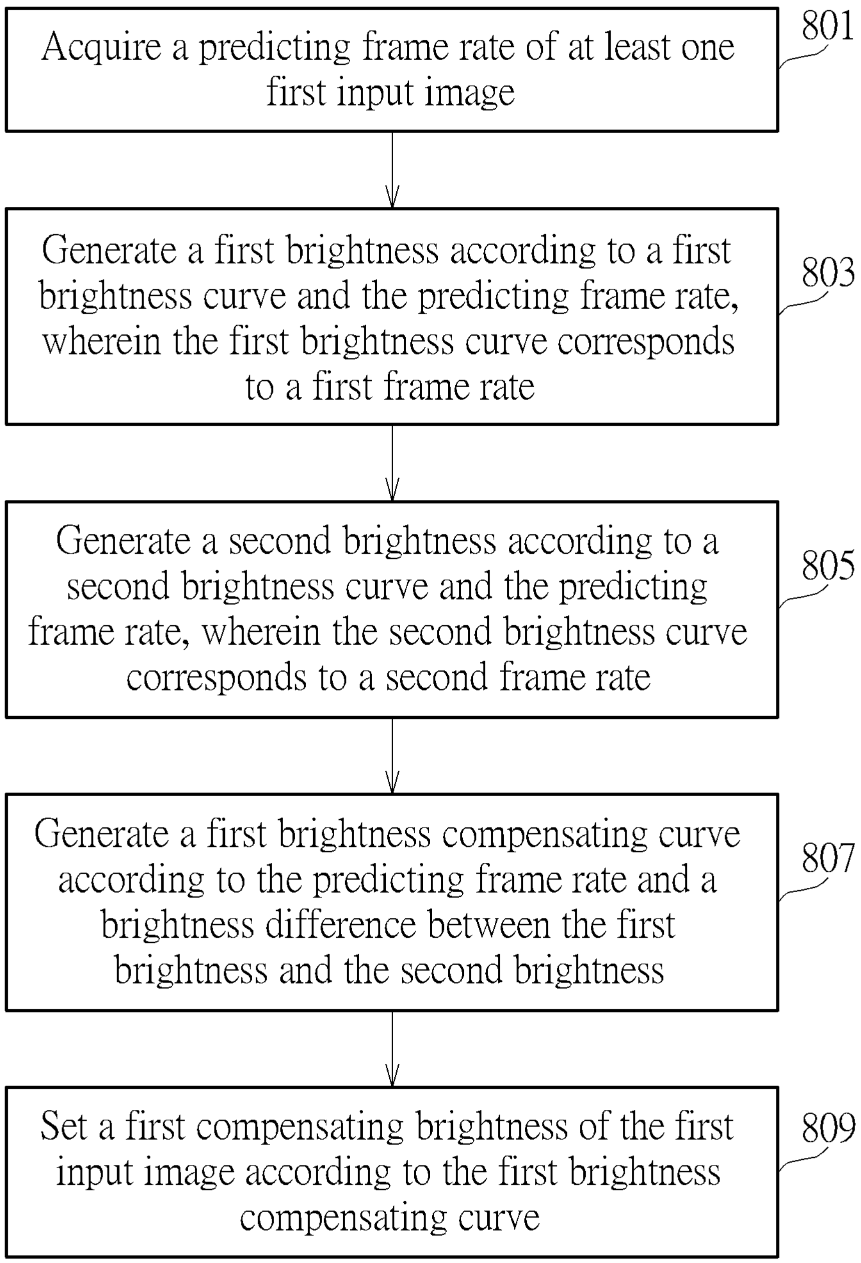

FIG. 8 is a flow chart illustrating image brightness adjusting methods according to different embodiments of the present invention.

Step 801

Acquire a predicting frame rate of at least one first input image

Take FIG. 2 for example, the frame rate is predicted by using the previous image of the frame F_L1.

Step 803

Generate a first brightness according to a first brightness curve and the predicting frame rate, wherein the first brightness curve corresponds to a first frame rate.

Step 805

Generate a second brightness according to a second brightness curve and the predicting frame rate, wherein the second brightness curve corresponds to a second frame rate.

Step 807

Generate a first brightness compensating curve according to the predicting frame rate and a brightness difference between the first brightness and the second brightness.

Step 809

Set a first compensating brightness of the first input image according to the first brightness compensating curve.

Take FIG. 2 for example, the predicting frame rate of the frame F_L1 is generated according to the image before the frame F_L1 and the frame F_L1 is processed accordingly. Briefly, in the embodiment of FIG. 8, the current image can be processed according to the predicting frame rate generated by the previous image.

Figure 9:
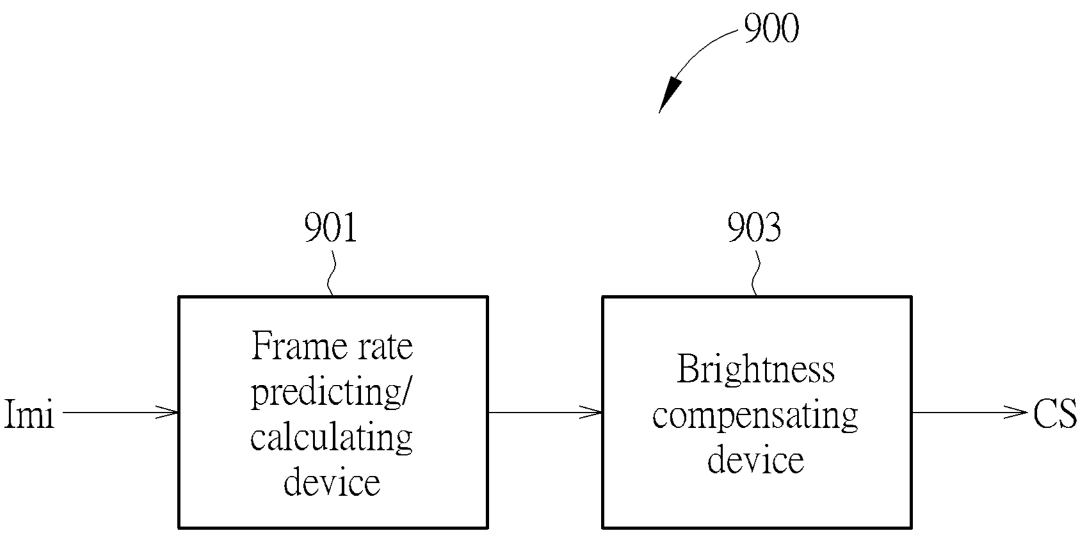
FIG. 9 is a block diagram illustrating an image brightness adjusting device, which can perform an image brightness adjusting method provided by the present invention, according to one embodiment of the present invention.

The aforementioned embodiments can be implemented by software, but can also be implemented by hardware. FIG. 9 is a block diagram illustrating an image brightness adjusting device 900, which can perform an image brightness adjusting method provided by the present invention, according to one embodiment of the present invention. The image brightness adjusting device 900 can be set in the display or in an image source (such as a GPU) which provides input images to the display, but can also be independent from the display and the image source. As shown in FIG. 9, the image brightness adjusting device 900 comprises a frame rate predicting/calculating device 901 and a brightness compensating device 903.

The frame rate predicting/calculating device 901 is configured to calculate or predict the frame rate according to the input image Imi as described in above-mentioned embodiments. The brightness compensating device 903 is configured to generate compensating brightness according to the calculated or predicting frame rate, and configured to generate a control signal CS for setting the compensating brightness. As mentioned above, the control signal CS can adjust the brightness of the image itself, adjust the backlight intensity of the display, or adjust the voltage used to control the compensating brightness in the display driving circuit. The frame rate predicting/calculating device 901 and the brightness compensating device 903 can be implemented by circuits. For example, the frame rate predicting/calculating device 901 and the brightness compensating device 903 may comprise a plurality of logic units or digital circuits to perform the steps in the above-mentioned embodiments.

As mentioned above, the image brightness adjusting method and the image brightness adjusting device provided by the present invention can dynamically adjust the image brightness, to reduce the brightness difference of the images at different frame rates and improve the flickering problem in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image brightness adjusting method, comprising:

(a) computing or predicting a first input frame rate according to at least one first input image;

(b) generating a first brightness according to a first brightness curve and the first input frame rate, wherein the first brightness curve corresponds to a first frame rate;

(c) generating a second brightness according to a second brightness curve and the first input frame rate, wherein the second brightness curve corresponds to a second frame rate;

(d) generating a first brightness compensating curve according to the first input frame rate and a brightness difference between the first brightness and the second brightness; and (e) setting a first compensating brightness of at least one second input image according to the first brightness compensating curve.

2. The image brightness adjusting method of claim 1, wherein the first frame rate is higher than the second frame rate, the first brightness is higher than the second brightness, and the first compensating brightness is lower than the first brightness and higher than the second brightness.

3. The image brightness adjusting method of claim 1, wherein the first frame rate is lower than the second frame rate, the first brightness is lower than the second brightness, and the first compensating brightness is lower than the second brightness and higher than the first brightness.

4. The image brightness adjusting method of claim 1, wherein the step (a) computes the first input frame rate according a time interval between two continuous Vsyncs.

5. The image brightness adjusting method of claim 1, wherein the step (a) computes the first input frame rate according a front porch of the first input image.

6. The image brightness adjusting method of claim 5, wherein the step (a) computes the first input frame rate according a complete time interval of the front porch.

7. The image brightness adjusting method of claim 5, wherein the step (a) computes the first input frame rate according only a portion of a complete time interval of the front porch.

8. The image brightness adjusting method of claim 1, further comprising:

computing or predicting a second input frame rate according to at least one third input image;

generating a third brightness according to the first brightness curve and the second input frame rate;

generating a fourth brightness according to the second brightness curve and the second input frame rate;

generating a second brightness compensating curve according to the second input frame rate and a brightness difference between the third brightness and the fourth brightness; and setting a second compensating brightness of at least one fourth input image with the second frame rate, according to the second brightness compensating curve.

9. The image brightness adjusting method of claim 8, wherein values of the first compensating brightness and the second compensating brightness are identical.

10. An image brightness adjusting method, comprising:

(a) acquiring a predicting frame rate of at least one first input image;

(b) generating a first brightness according to a first brightness curve and the predicting frame rate, wherein the first brightness curve corresponds to a first frame rate;

(c) generating a second brightness according to a second brightness curve and the predicting frame rate, wherein the second brightness curve corresponds to a second frame rate;

(d) generating a first brightness compensating curve according to the predicting frame rate and a brightness difference between the first brightness and the second brightness; and (e) setting a first compensating brightness of the first input image according to the first brightness compensating curve.

11. An image brightness adjusting device, comprising:

a frame rate predicting/computing device, configured to compute or to predict a first input frame rate according to at least one first input image; and a brightness compensating device, configured to perform following steps:

(a) generating a first brightness according to a first brightness curve and the first input frame rate, wherein the first brightness curve corresponds to a first frame rate;

(b) generating a second brightness according to a second brightness curve and the first input frame rate, wherein the second brightness curve corresponds to a second frame rate;

(c) generating a first brightness compensating curve according to the first input frame rate and a brightness difference between the first brightness and the second brightness; and (d) setting a first compensating brightness of at least one second input image according to the first brightness compensating curve.

12. The image brightness adjusting device of claim 11, wherein the first frame rate is higher than the second frame rate, the first brightness is higher than the second brightness, and the first compensating brightness is lower than the first brightness and higher than the second brightness.

13. The image brightness adjusting device of claim 11, wherein the first frame rate is lower than the second frame rate, the first brightness is lower than the second brightness, and the first compensating brightness is lower than the second brightness and higher than the first brightness.

14. The image brightness adjusting device of claim 11, wherein the frame rate predicting/computing device computes the first input frame rate according a time interval between two continuous Vsyncs.

15. The image brightness adjusting device of claim 11, wherein the frame rate predicting/computing device computes the first input frame rate according a front porch of the first input image.

16. The image brightness adjusting device of claim 15, wherein the frame rate predicting/computing device computes the first input frame rate according a complete time interval of the front porch.

17. The image brightness adjusting device of claim 15, wherein the frame rate predicting/computing device computes the first input frame rate according only a portion of a complete time interval of the front porch.

18. The image brightness adjusting device of claim 11, wherein the brightness compensating device further performs following steps:

computing or predicting a second input frame rate according to at least one third input image;

generating a third brightness according to the first brightness curve and the second input frame rate;

generating a fourth brightness according to the second brightness curve and the second input frame rate;

generating a second brightness compensating curve according to the second input frame rate and a brightness difference between the third brightness and the fourth brightness; and setting a second compensating brightness of at least one fourth input image with the second frame rate, according to the second brightness compensating curve.

19. The image brightness adjusting device of claim 18, wherein values of the first compensating brightness and the second compensating brightness are identical.

* * * * *